United States Patent [19]
Mori et al.

[11] Patent Number: 5,521,456
[45] Date of Patent: May 28, 1996

[54] VIBRATING GYROSCOPE

[75] Inventors: Akira Mori; Yukio Sakashita; Takeshi Nakamura, all of Nagaokakyo, Japan

[73] Assignee: Murata Manufacturing Co., Ltd., Kyoto-fu, Japan

[21] Appl. No.: 352,565

[22] Filed: Dec. 9, 1994

[30] Foreign Application Priority Data

Dec. 16, 1993 [JP] Japan .................................. 5-316782

[51] Int. Cl.$^6$ .................................................. H01L 41/08
[52] U.S. Cl. ........................ 310/326; 310/348; 310/367
[58] Field of Search .................................... 310/321, 326, 310/348, 367

[56] References Cited

U.S. PATENT DOCUMENTS

| | | | |
|---|---|---|---|
| 5,256,929 | 10/1993 | Terajima | 310/326 |
| 5,345,822 | 9/1994 | Nakamura et al. | 310/316 |
| 5,349,857 | 9/1994 | Kasanami et al. | 310/316 |

*Primary Examiner*—Thomas M. Dougherty
*Attorney, Agent, or Firm*—Nikaido, Marmelstein, Murray & Oram

[57] ABSTRACT

The vibrating gyroscope includes, for example, a regular triangular prism-shaped vibrating body. The vibrating body is formed with a material which generally generates mechanical vibration such as elinver, ceramics. The piezoelectric elements are respectively formed to the three sidefaces of the vibrating body. An oscillation circuit is connected between the two piezoelectric elements and the other piezoelectric element. Further, two U-shape supporting members made of metal wire are fixed to the ridge-line portions of the vicinity of the nodal points of the vibrating body. The both ends of the two supporting members are fixed to the rectangular-shaped supporting body. The supporting body has a cutting portion piercing through it from its one surface to the other or a groove portion as a suppressing means for suppressing the interference of vibrations between the fixing points of the ends of one supporting member and those of the other supporting member.

12 Claims, 4 Drawing Sheets

VIBRATING GYROSCOPE

BACKGROUND OF THE INVENTION

1. Field of the Invention

The present invention is related to a vibrating gyroscope and, more particularly, to the type of vibrating gyroscope that can be applied for a navigation system providing an appropriate guidance of a vehicle by detecting the position of a moving body by sensing its rotational angular velocity, or to the type of vibrating gyroscope that can be applied for a damping system such as preventing device for preventing shaking of hands that suppresses vibration by detecting an external vibration.

2. Description of the Prior Art

FIG. 7 is an exploded perspective view showing an example of a conventional vibrating gyroscope. The vibrating gyroscope 30 includes a regular triangular prism-shaped vibrating body 31. The vibrating gyroscope 30 is made of a constant-elastic metal material such as elinver. On three side faces of the vibrating body 31, piezoelectric elements 32a, 32b, 32c are secured respectively by suitable means such as an adhesive. The piezoelectric elements 32a, 32b, 32c are made of, for example, by forming electrodes on both surfaces of a piezoelectric ceramics.

An oscillation circuit (not shown) is connected between the piezoelectric elements 32a, 32b and the piezoelectric element 32c. By a signal from the oscillation circuit, the vibrating body 31 bends and vibrates in the direction perpendicular to the face on which the piezoelectric element 32c is formed. In this situation, when a rotation is applied around the central axial direction of the vibrating body 31, the vibration direction of the vibrating body 31 changes by a Corioli's force, according as a change of the vibration direction, a difference is generated between output voltages of the piezoelectric elements 32a and 32b. Thus, a rotational angular velocity applied to the vibrating gyroscope 30 can be detected by measuring the difference of the output voltages.

In the vibrating gyroscope 30 constructed as described above, supporting members 33a and 33b made of metal wire are mounted on ridge-line portions in the vicinity of the nodal points of the vibrating body 31. Both ends of the supporting members 33a and 33b are secured to the rectangular-shaped supporting bodies 35a and 35b made of metal material respectively in order to suppress the propagation and interference of the vibration of the vibrating body 31. In this arrangement, two holes 36, 36 are provided on each of the supporting bodies 35a and 35b, respectively. Both the ends of one supporting members 33a are inserted into the two holes 36, 36 on the supporting body 35a and soldered. In the same way, both the ends of the other supporting member 33b are inserted into the two holes 36, 36 on the other supporting body 35b and soldered. The supporting bodies 35a and 35b are secured to a surface of a strip-shaped board 40 made of a metal material via a cushion material 37.

However, the supporting members 33a and 33b must be secured to the two independent supporting bodies 35a and 35b, and these supporting bodies 35a and 35b must be secured to the board 40 via the cushion material 37 in the conventional vibrating gyroscope 30; therefore its structure is complicated and difficult to assemble, accompanied by rigorous dimensional accuracy.

When these members are deformed by aging and temperature variations, the deformations of each member are accumulated, which may drastically change the vibration attitude of the vibrating body 31. Furthermore, the supporting bodies 35a and 35b are small in mechanical dimensions and the motions of the supporting members 33a and 33b connected by the vibration of the vibrating body 31 cannot be suppressed sufficiently. Consequently, it is difficult that a stable vibration can be realized in the vibrating body 31, and a good characteristics can be attained from the standpoint of a sensitivity.

SUMMARY OF THE INVENTION

A major object of the present invention is to provide a vibrating gyroscope which can obtain stable vibration with a simple structure and moreover, it can obtain a good characteristics from the standpoint of a sensitivity.

In order to achieve the above object, the vibrating gyroscope related to the present invention has a prism-shaped vibrating body, two supporting members fixed in the vicinity of the nodal points of the vibrating body to support the vibrating body, and a supporting body made of a strip of plate which are secured to the both ends of the supporting members; characterized in that there are provided a suppressing means for suppressing the interference of vibrations is formed on the supporting body between the both ends of one supporting member secured to the supporting body and the both ends of the other supporting member secured to the supporting body.

The above suppressing means can be formed by a cutting portion piercing through the supporting body from its one main surface to the other main surface or a groove portion provided on the supporting body.

The above cutting portion can be H-shaped when viewed from a plane. It can also be formed in the direction perpendicular to the longitudinal direction of the vibrating body so that it may not be separated. The cutting portion can consist of two cutting portions which extend from the opposite ends of the supporting body and engage with each other. The cutting portion it can be formed so that a part of it encloses the ends of the supporting members secured to the supporting body.

The groove portion can be made in the direction perpendicular to the longitudinal direction of the vibrating body from one end to the other end of the supporting body. It can be designed a H-shape in a plane view. The groove portion can be formed so that a part of it may enclose the ends of the supporting members secured to the supporting body. The groove portion can consist of two groove portions which extend from the opposite ends of the supporting body and engage with each other.

In the above configuration, the supporting body is made of a single strip of plate, therefore it can be larger in dimensions and so it can suppress linking the supporting members by vibration of the vibrating body. The cutting portion suppresses the interference of the vibrations by elongating and narrowing the path of the propagation of vibrating body's vibration between the two fixing portions of the supporting members on the supporting body. Similarly, the groove portion suppresses the interference of vibrations by elongating the propagation path of vibrating body's vibration between the two fixing portions of the supporting members on the supporting body.

In the vibrating gyroscope related to the present invention, its structure is simple such that a cutting portion or groove portion is provided on a supporting body made of a single strip of plate to suppress an interference of a vibration, thus it can easily be assembled in higher accuracy in a dimension and less affected by aging and temperature variations because a smaller number of mechanical members are used. The supporting body is made of a single strip of plate, therefore it can be larger and can be suppressed from vibrations linked by vibrating body's vibration and so it can obtain stable vibration and moreover, it can obtain a good characteristics from the standpoint of a sensitivity.

The above and other object, features, aspects and advantages of the present invention will become more apparent from the following detailed descriptions of the embodiments with reference to the accompanying drawings.

DESCRIPTION OF THE PREFERRED EMBODIMENTS

Figure 1A:
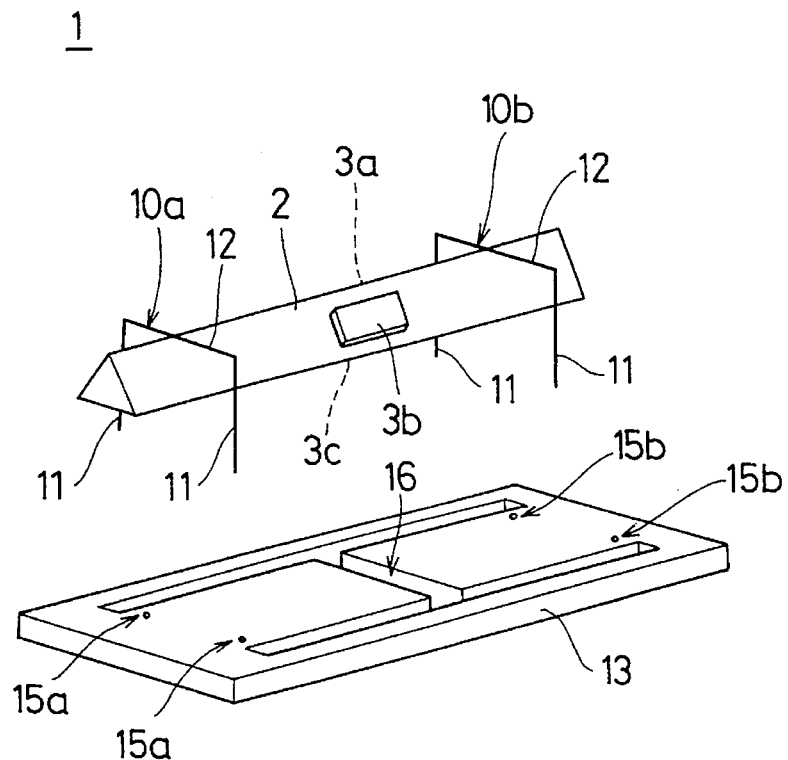
FIG. 1A is an exploded perspective view showing one embodiment of the present invention.
Figure 1B:
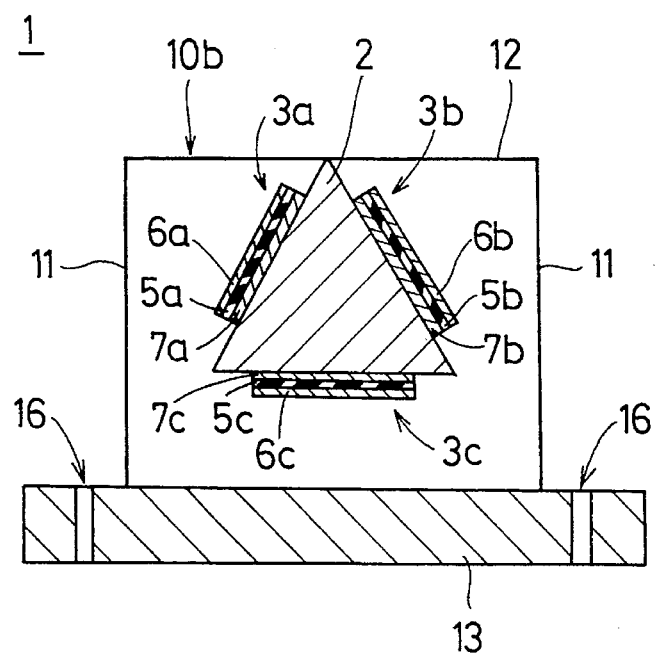
FIG. 1B is an enlarged sectional view of its major portion.

FIG. 1A is an exploded perspective view showing one embodiment of the present invention, FIG. 1B is an enlarged sectional view of its major portion.

A vibrating gyroscope 1 comprises a regular triangular prism-shaped vibrating body 2. The vibrating body 2 is formed with a material which generally generates mechanical vibration, such as elinver, iron-nickel alloy, quartz, glass, crystal, ceramics, nickel, iron, chromium, titanium. Piezoelectric elements 3a, 3b, 3c are respectively formed on about central portions of the three side faces of the vibrating body 2. The piezoelectric element 3a include a piezoelectric body 5a made of a piezoelectric ceramics, the electrodes 6a and 7a are formed on both surfaces of the piezoelectric body 5a. The electrode 7a is secured to a side face of the vibrating body 2 by means of, for example, an adhesive. Similarly, the piezoelectric elements 3b and 3c have piezoelectric body 5b and 5c, respectively. The electrodes 6b and 7b are formed on both surfaces of the piezoelectric body 5b, and the electrodes 6c and 7c are secured on both side faces of the piezoelectric body 5c. The electrodes 7b and 7c of the piezoelectric elements 3b and 3c, respectively, are secured to the two side faces of the vibrating body 2.

An oscillation circuit (not shown) is connected between the piezoelectric element 3a, 3b and the piezoelectric element 3c. The vibrating body 2 bends and vibrates in the direction perpendicular to the face on which the piezoelectric element 3c is formed by means of the oscillation circuit. In this situation, when a rotation is applied around the central axis of the vibrating body 2, the bending and vibrating direction of the vibrating body 2 changes by a Corioli's force. Due to this change, a difference is produced between output voltage signals of the piezoelectric elements 3a and 3b. Consequently, a rotational angular velocity applied to the vibrating gyroscope 1 can be sensed by measuring the difference of the output voltage signals between the piezoelectric elements 3a and 3b.

The two supporting members 10a and 10b made of metal wire are mounted on ridge-line portions in the vicinity of the nodal points of the vibrating body 2. In this case, each of the supporting members 10a and 10b consists of a pair of legs 11, 11 and a connecting member 12 between the legs 11, 11, and is shaped like a U-shape in cross section as a whole.

One supporting member 10a includes the straight connecting member 12 in the transverse direction to the vibrating body 2 and the two straight legs 11, 11 are bent downward from the both ends of the connecting member 12. On the other hand, the other supporting member 10b is in the same structure as the supporting member 10a and has the connecting member 12 and a pair of legs 11, 11.

The midpoints of the connecting members 12 of the two supporting members 10a and 10b are secured by means of welding process or an adhesive to the ridge-line portions of the vibrating body 2 on which the piezoelectric elements 3a and 3b are formed. Let the length of the vibrating body 2 in the longitudinal direction be L in this embodiment, then the two supporting members 10a and 10b are secured to the points 0.224 L away from opposite ends of the vibrating body 2 in the longitudinal direction.

The tips of the legs 11, 11 of the two supporting members 10a and 10b are fixed onto one main surface of the supporting body made of a single strip of plate. The supporting body is made of a metal material or a resin material. In this embodiment, the two supporting members 10a and 10b are fixed to the strip-shaped supporting body 13. In this case, the two holes 15a, 15a are provided near the end of the supporting body 13 in the longitudinal direction and with an interval in its width direction. Similarly, the two holes 15b, 15b are provided near the other end of the supporting body 13 in the longitudinal direction and with an interval in the width direction of the supporting body 13.

The tips of the two legs 11, 11 of the supporting member 10a are inserted into the holes 15a, 15a and soldered to the supporting body 13. Similarly, the tips of the legs 11, 11 of the other supporting member 10b are inserted into the holes 15b, 15b and soldered to the supporting body 13. Thus, the supporting body 13 to which the two supporting members 10a and 10b is made of a single strip of plate, therefore it is large in dimensions and so it can suppress linking the supporting members 10a and 10b by the vibration of the vibrating body 2.

As a suppressing means for suppressing the interference of vibrations, e.g., a cutting portion 16 are provided between the holes 15a, 15a and 15b, 15b on the supporting body 13 onto which the tips of the legs 11, 11 of the supporting members 10a and 10b are fixed. The cutting portion 16 is formed, for example, by making a cutting portion of a H-like configuration in a plane piercing through the supporting body 13 from one surface to the other surface between the tips of the legs 11, 11 of the supporting member 10a fixed to the supporting body 13 and those of the other legs 11, 11 of the supporting member 10b fixed to the same, that is, between the fixing points of the supporting member 10a and those of the supporting member 10b.

A vibration propagation path for the vibrating body 2 on the supporting body 13, that is, a narrow and long propagation path between the fixing points of the two supporting members 10a and 10b are formed on the supporting body 13 by providing the cutting portion 16 on it. Consequently, the suppressing means 16 suppresses the interference of vibrations on it.

Figure 2:
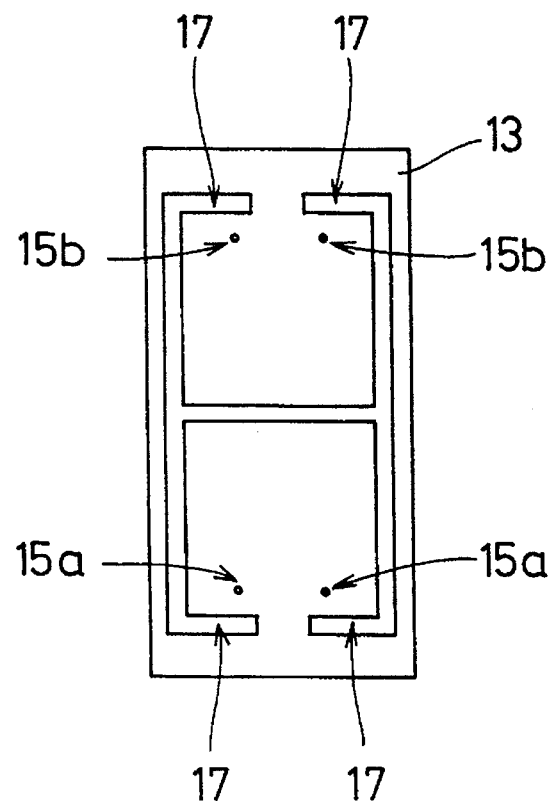
FIG. 2 is a plane view of a modified example of the supporting body shown in FIG. 1.

In the above embodiment shown in FIGS. 1A and 1B, the suppressing means for suppressing the interference of vibrations is formed by the cutting portion 16 having a H-shaped configuration from the viewpoint of a plane. However, as particularly show in FIG. 2, the suppressing means may be so shaped that the cutting portions are elongated from the four tips of the H-shaped configuration inward in a width direction on the supporting body 13 in a way the elongated cutting portions 17 to enclose the two pairs of holes 15a, 15a and 15b, 15b.

Figure 3:
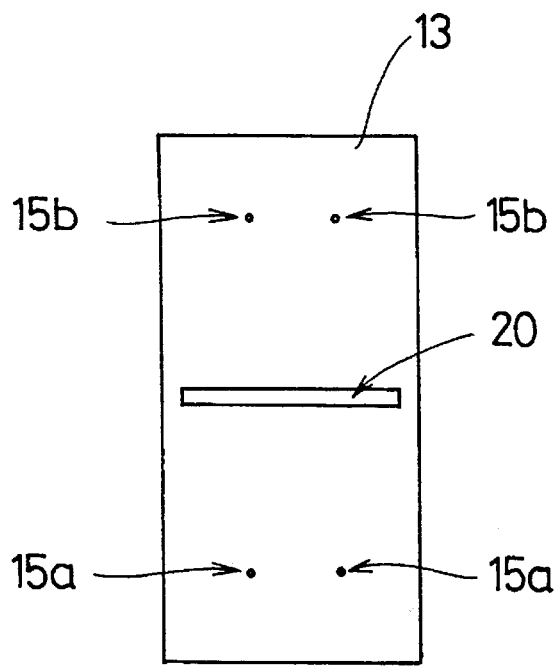
FIG. 3 is a major portion plane view of an another modified example of the supporting body shown in FIG. 1.

As an another suppressing means, a straight cutting portion 20 can be made, in the middle in the width direction of the supporting body 13 at the center on it in its longitudinal direction between the two pairs of holes 15a, 15a and 15b, 15b as particularly shown in FIG. 3. In this case, the cutting portion 20 does not reach the ends of the supporting body 13 in its width direction, that is, it does not divide the supporting body 13 into two parts.

Figure 4:
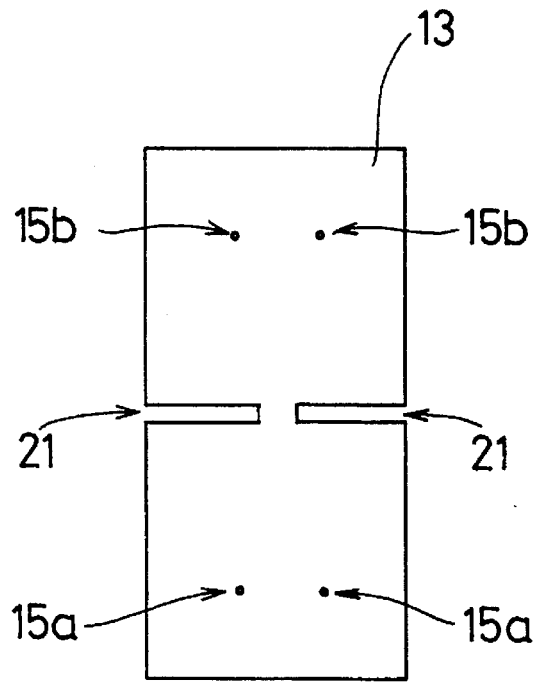
FIG. 4 is a major portion plane view of a still another modified example of the supporting body shown in FIG. 1.

As a still another suppressing means may be formed by the two straight cuttings portion 21, 21 as shown in FIG. 4 in the central portion of the supporting body 13 in the longitudinal direction between the two pair of holes 15a, 15a and 15b, 15b, extending from the both ends of the supporting body 13 inward in the width direction. The two straight cutting portions 21,21 do not meet with each other.

Figure 5:
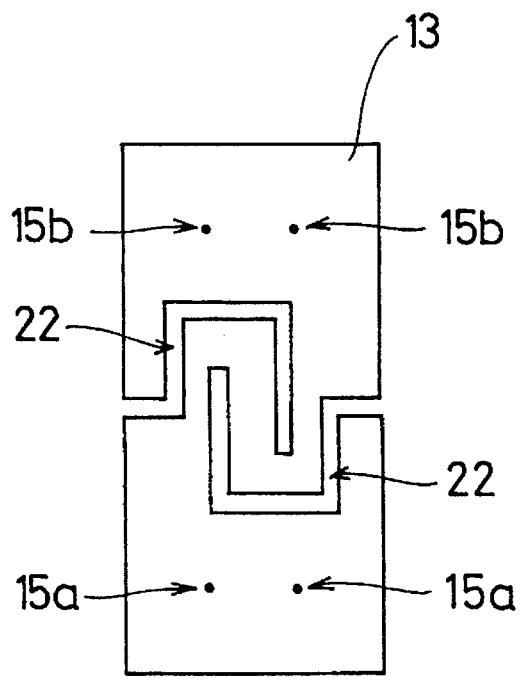
FIG. 5 is a major portion plane view of a separate modified example of the supporting body shown in FIG. 1.

As s separate suppressing means may be so formed by the two cutting portions 22, 22 having a U-shaped configuration in a plane as shown in FIG. 5 extending from the opposite ends of the supporting body 13 in the width direction that a part of the cuttings portion 22, 22 engage with each other. The two cutting portions 22, 22 do not meet with each other.

Thus, the cutting portions made on the supporting body 13 as the means for suppressing the interference of the vibration can be designed in any ways so that they may elongate and narrow the propagation path of the vibration of the vibrating body 2 between the fixing points of the two supporting members 10a and 10b and may not separate the supporting body 13.

Figure 6:
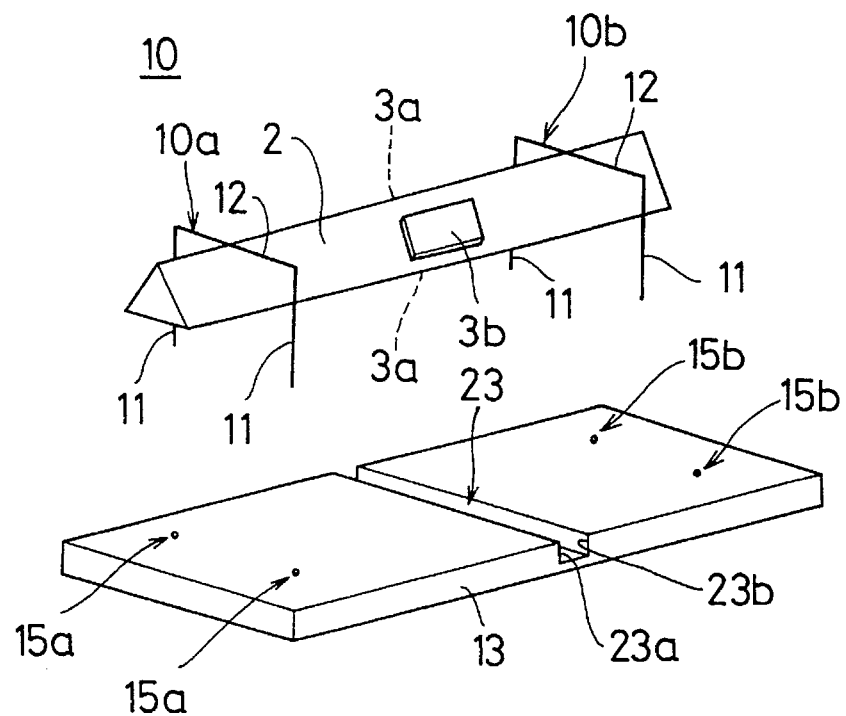
FIG. 6 is an exploded perspective view of an another embodiment of the present invention.
Figure 7:
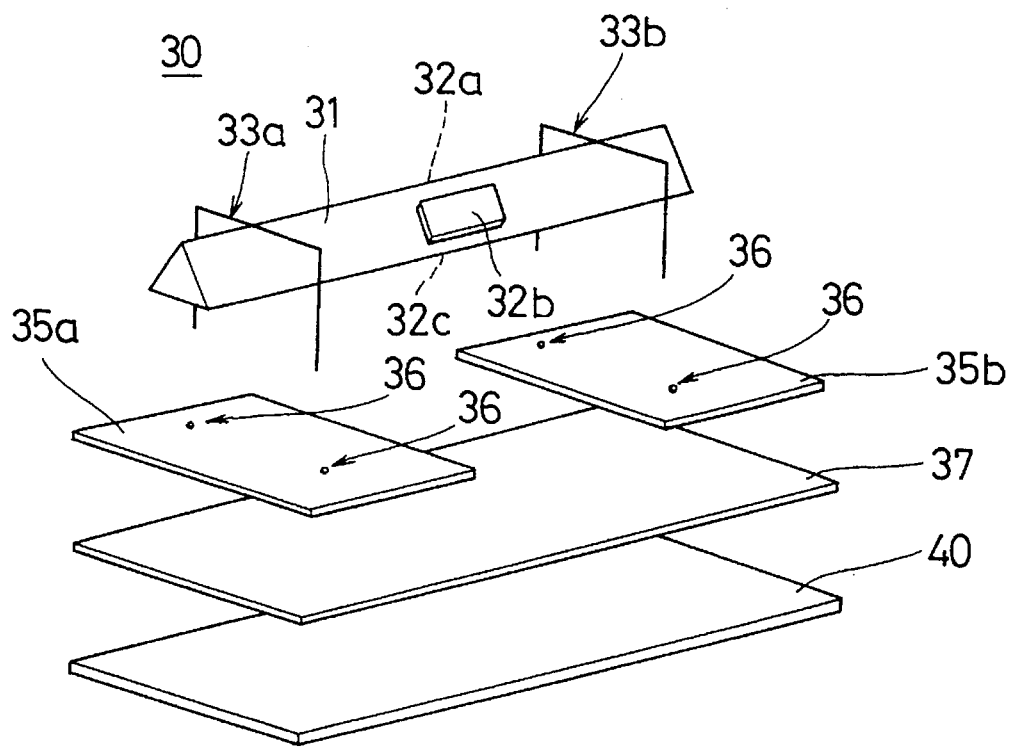
FIG. 7 is an exploded perspective view showing an example of a conventional vibrating gyroscope.

FIG. 6 is an exploded perspective view of an another embodiment of the present invention. The same reference numerals are assigned to those parts which are identical to those shown in FIGS. 1A and 1B, and explanation is omitted.

The supporting body 13 of the vibrating gyroscope 10 as shown in FIG. 6 has, for example, a straight groove portion 23 as the suppressing means for suppressing the interference of the vibration between the fixing points of the two supporting members 10a and 10b extending from one end to the other of itself in the width direction. In this case, the propagation path of the vibration of the vibrating body 2 between the fixing points of the supporting members 10a and 10b is elongated by the sum of lengths of side walls 23a and 23b of the groove portion 23. Thus, the interference of vibrations is suppressed. The above propagation path is elongated in proportion to the number of groove portion 23. Therefore, the greater is the number of them, the more effective are they for suppression. The form of the groove portion 23 can be as shown in FIGS. 1A, 2, 3, 4, and 5. That is, an object aim of providing the groove portion is to elongate the propagation path of vibration between the fixing points of the legs of the supporting members on the supporting body and it can take any form to achieve the object.

In the above-mentioned embodiments of the present invention, the vibrating body 2 is regular triangular prism-shaped, but it can take the other forms such as a quadrangular-prism like configuration, pentagonal-prism like configuration or cylindrical form.

It will be apparent from the foregoing that, while the present invention has been described in detail and illustrated, these are only particular illustrations and example, and the invention is not limited to these. The sprit and scope of the invention is limited only by the appended claims.

What is claimed is:

1. A vibrating gyroscope comprising:

a prism-shaped vibrating body;

two supporting members fixed in a vicinity of nodal points of said vibrating body in order to support said vibrating body;

a supporting body is formed with a strip of plate to which both ends of said supporting members are secured; and a suppressing means for suppressing interference of a vibration, said suppressing means formed on said supporting body between both ends of one of said supporting members secured to said supporting body and both ends of the other said supporting members secured to said supporting body and said suppressing means does not separate said supporting body into separate portions.

2. The vibrating gyroscope in accordance with claim 1, wherein said suppressing means is formed by a cutting portion piercing through said supporting body from one main surface of said supporting body to the other main surface of said supporting body.

3. The vibrating gyroscope in accordance with claim 1, wherein said suppressing means is formed by a groove portion formed on said supporting body.

4. The vibrating gyroscope in accordance with claim 2, wherein said cutting portion is formed to a H-shaped configuration from a viewpoint of a plane.

5. The vibrating gyroscope in accordance with claim 2, wherein said cutting portion is formed in a direction perpendicular to a longitudinal direction of said vibrating body on said supporting body in a way that said cutting portion does not separate said supporting body into said separate portions.

6. The vibrating gyroscope in accordance with claim 2, wherein said cutting portion consists of two separate cutting portions which extend from opposite ends of said supporting body and oppose each other.

7. The vibrating gyroscope in accordance with claim 2, wherein said cutting portion is so formed that a part of said cutting portion can enclose both ends of said supporting members secured to said supporting body.

8. The vibrating gyroscope in accordance with claim 3, wherein said groove portion is formed in a direction perpendicular to a longitudinal direction of said vibrating body on said supporting body from one end of said supporting body to the other end of said supporting body.

9. The vibrating gyroscope in accordance with claim 3, wherein said groove portion is formed to a H-shaped configuration from a viewpoint of a plane.

10. The vibrating gyroscope in accordance with claim 3, wherein said groove portion is so formed that a part of said groove portion encloses both ends of said supporting members fixed to said supporting body.

11. The vibrating gyroscope in accordance with claim 3, wherein said groove portion consists of two separate groove portions which extend from opposite ends of said supporting body and oppose each other.

12. A vibrating gyroscope comprising:

a prism-shaped vibrating body;

two supporting members fixed in a vicinity of nodal points of said vibrating body in order to support said vibrating body;

a supporting body is formed with a strip of plate to which both ends of said supporting members are secured; and a suppressing means for suppressing interference of a vibration, said suppressing means formed on said supporting body between both ends of one of said supporting members secured to said supporting body and both ends of the other said supporting members secured to said supporting body, wherein said suppressing means is formed by a cutting portion piercing through said supporting body from one main surface of said supporting body to the other main surface of the said supporting body, and wherein said cutting portion is formed in a direction perpendicular to a longitudinal direction of said vibrating body on said supporting body in a way that said cutting portion does not separate said supporting body into separate portions.

\* \* \* \* \*